(12) United States Patent
Zhang

(10) Patent No.: US 9,817,022 B2
(45) Date of Patent: Nov. 14, 2017

(54) METHOD AND APPARATUS FOR DETERMINING VEHICLE ACCELERATION

(71) Applicant: Huawei Device Co., Ltd., Shenzhen (CN)

(72) Inventor: Di Zhang, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 411 days.

(21) Appl. No.: 14/584,882

(22) Filed: Dec. 29, 2014

(65) Prior Publication Data

US 2015/0160258 A1 Jun. 11, 2015

Related U.S. Application Data

(63) Continuation of application No. PCT/CN2013/088694, filed on Dec. 5, 2013.

(51) Int. Cl.
*G01P 15/18* (2013.01)
*G01S 19/13* (2010.01)
*G01P 21/00* (2006.01)

(52) U.S. Cl.
CPC .............. *G01P 15/18* (2013.01); *G01P 21/00* (2013.01); *G01S 19/13* (2013.01)

(58) Field of Classification Search
None
See application file for complete search history.

(56) References Cited

U.S. PATENT DOCUMENTS

| 7,463,953 | B1 * | 12/2008 | Lee | ........................ | B60W 40/12 |
| | | | | | 701/1 |
| 2003/0109258 | A1 * | 6/2003 | Mantyjarvi | .............. | A61B 5/11 |
| | | | | | 455/440 |

(Continued)

FOREIGN PATENT DOCUMENTS

| CN | 1928568 A | 3/2007 |
| CN | 101322034 A | 12/2008 |

(Continued)

OTHER PUBLICATIONS

Christopher J. Fisher, Using an Accelerometer for Inclination Sensing, Contributed by Convergence Promotions LLC ,May 6, 2011, 11 pages.*

(Continued)

*Primary Examiner* — Tung Lau
(74) *Attorney, Agent, or Firm* — Slater Matsil, LLP

(57) ABSTRACT

Embodiments of the present invention provide a method and an apparatus for determining a vehicle acceleration, which are used to eliminate an interference element in data of an accelerometer, and correct accelerometer data that is obtained after interference is eliminated, into acceleration data of a vehicle. The method includes: acquiring original acceleration data measured by the accelerometer in a running process of the vehicle; eliminating, according to the acquired original acceleration data, interference generated by gravity on the original acceleration data, and interference generated, on the original acceleration data, by a change of an angle of the accelerometer caused by moving of the accelerometer relative to the vehicle; and determining acceleration data of the vehicle in the running process according to original acceleration data that is obtained after interference is eliminated.

20 Claims, 7 Drawing Sheets

(56) References Cited

U.S. PATENT DOCUMENTS

| | | |
|---|---|---|
| 2005/0139004 A1 | 6/2005 | Lee et al. |
| 2005/0181810 A1 | 8/2005 | Camp, Jr. et al. |
| 2007/0067096 A1 | 3/2007 | Ohkubo et al. |
| 2008/0294342 A1 | 11/2008 | Hoshizaki et al. |
| 2009/0037129 A1 | 2/2009 | Kretschmann et al. |
| 2010/0318257 A1 | 12/2010 | Kalinadhabhotla |
| 2010/0318527 A1 | 12/2010 | Nandy et al. |
| 2011/0153367 A1 | 6/2011 | Amigo et al. |
| 2011/0202225 A1 | 8/2011 | Willis et al. |
| 2012/0041640 A1 | 2/2012 | Videtich et al. |
| 2012/0041702 A1 | 2/2012 | Toda et al. |
| 2012/0209476 A1 | 8/2012 | Andres et al. |
| 2012/0253585 A1 | 10/2012 | Harvie |
| 2012/0278023 A1 | 11/2012 | Han |
| 2013/0073142 A1 | 3/2013 | Hergesheimer et al. |
| 2013/0081442 A1 | 4/2013 | Basir et al. |
| 2013/0318257 A1 | 11/2013 | Lee et al. |

FOREIGN PATENT DOCUMENTS

| | | |
|---|---|---|
| CN | 102107652 A | 6/2011 |
| CN | 201886531 U | 6/2011 |
| CN | 102184549 A | 9/2011 |
| CN | 102371905 A | 3/2012 |
| CN | 102422166 A | 4/2012 |
| CN | 102470873 A | 5/2012 |
| CN | 102667672 A | 9/2012 |
| CN | 202758405 U | 2/2013 |
| CN | 103218062 A | 7/2013 |
| EP | 2434298 A1 | 3/2012 |
| JP | 02019771 A | 1/1990 |
| JP | 10332415 A | 12/1998 |
| JP | 2006267112 A | 10/2006 |
| JP | 2007522471 A | 8/2007 |
| JP | 2008215917 A | 9/2008 |
| WO | 0218873 A2 | 3/2002 |
| WO | 2004056425 A2 | 7/2004 |

OTHER PUBLICATIONS

Hagan, C., E., et al., "Accelerometer Based Alignment Transfer (ABAT)" IEEE Position Location and Navigation Symposium, 1992, pp. 133-140.

* cited by examiner

METHOD AND APPARATUS FOR DETERMINING VEHICLE ACCELERATION

This application is a continuation of International Application No. PCT/CN2013/088694, filed on Dec. 5, 2013, which is hereby incorporated by reference in its entirety.

TECHNICAL FIELD

The present invention relates to the field of sensory data fusion technologies, and in particular, to a method and an apparatus for determining a vehicle acceleration.

BACKGROUND

An accelerometer is a commonly used motion sensor. An accelerometer attached to a moving object can be capable of detecting acceleration data of the moving object in three axial directions of the accelerometer separately.

In order to assess a behavior of a driver, an accelerometer may be used to acquire acceleration data of a vehicle in a running process. Original acceleration data measured by the accelerometer is not only related to an acceleration of the vehicle in the running process but also interfered with by gravity. In addition, after the accelerometer is placed on the vehicle, three axial directions of the accelerometer are generally not precisely aligned with a straight ahead direction, a side direction, and a vertical direction of the vehicle separately, which increases difficulty in correction of the original acceleration data measured by the accelerometer. In addition, in the running process of the vehicle, the accelerometer may move relative to the vehicle, which causes a placing angle change, and may also impose interference on the original acceleration data measured by the accelerometer and lead to inaccuracy of the acceleration data of the vehicle in the running process that is obtained according to the original acceleration data of the accelerometer.

SUMMARY

Embodiments of the present invention provide a method and an apparatus for determining a vehicle acceleration, so as to obtain relatively accurate acceleration data of a vehicle in a running process according to original acceleration data measured by an accelerometer.

Specific technical solutions provided by the embodiments of the present invention are as follows:

According to a first aspect, a method for determining a vehicle acceleration is provided, including:

acquiring original acceleration data measured by an accelerometer in a running process of a vehicle;

eliminating, according to the acquired original acceleration data, interference generated by gravity on the original acceleration data, and interference generated, on the original acceleration data, by a change of an angle of the accelerometer caused by moving of the accelerometer relative to the vehicle; and determining acceleration data of the vehicle in the running process according to original acceleration data that is obtained after interference is eliminated.

With reference to the first aspect, in a first possible implementation manner, a data size of the original acceleration data is less than a preset threshold value.

With reference to the first aspect, in a second possible implementation manner, the original acceleration data measured by the accelerometer includes:

acceleration data, measured by the accelerometer, in three axial directions of the accelerometer separately; and the acceleration data of the vehicle in the running process includes:

acceleration data in a straight ahead direction of the vehicle, acceleration data in a side direction that is perpendicular to the straight ahead direction, and acceleration data in a direction that is perpendicular to a plane formed by the straight ahead direction and the side direction.

With reference to the second possible implementation manner of the first aspect, in a third possible implementation manner, the eliminating interference generated by gravity on the original acceleration data includes:

determining, according to the original acceleration data, data that is used to indicate a direction of a gravitational acceleration in coordinate system space constituted by the three axial directions of the accelerometer;

determining, according to the data that is used to indicate the direction of the gravitational acceleration in the coordinate system space constituted by the three axial directions of the accelerometer and magnitude of the gravitational acceleration, acceleration components of the gravitational acceleration in the three axial directions of the accelerometer; and respectively subtracting the acceleration components of the gravitational acceleration in the three axial directions of the accelerometer from the acceleration data, measured by the accelerometer, in the three axial directions of the accelerometer separately, to obtain original acceleration data on which the interference generated by the gravity is eliminated.

With reference to the third possible implementation manner of the first aspect, in a fourth possible implementation manner, the determining, according to the original acceleration data, data that is used to indicate a direction of a gravitational acceleration in coordinate system space constituted by the three axial directions of the accelerometer includes:

performing space curve fitting processing on the original acceleration data to obtain data corresponding to a fitted curve; where the data corresponding to the fitted curve is data that has indicated the direction of the gravitational acceleration in the coordinate system space constituted by the three axial directions of the accelerometer.

With reference to the third possible implementation manner of the first aspect, in a fifth possible implementation manner, the method further includes determining the magnitude of the gravitational acceleration, and the determining the magnitude of the gravitational acceleration specifically includes:

acquiring vehicle velocity data through an On-Board Diagnostics OBD interface of the vehicle;

determining, according to the acquired vehicle velocity data, acceleration data measured by the accelerometer when a vehicle velocity is zero; and determining the magnitude of the gravitational acceleration according to the acceleration data measured by the accelerometer when the vehicle velocity is zero.

With reference to the first aspect, in a sixth possible implementation manner, the eliminating interference generated, on the original acceleration data, by a change of an angle of the accelerometer caused by moving of the accelerometer relative to the vehicle includes:

processing the original acceleration data by using a locally linear embedding algorithm, and converting acceleration data measured after the change of the angle of the accelerometer caused by the moving of the accelerometer relative to the vehicle, into acceleration data measured when the angle of the accelerometer remains unchanged.

With reference to the first aspect, in a seventh possible implementation manner, the determining acceleration data of the vehicle in the running process according to original acceleration data that is obtained after interference is eliminated includes:

using a matrix to represent the original acceleration data that is obtained after the interference is eliminated; and performing singular value decomposition processing on the original acceleration data that is represented by using the matrix and is obtained after the interference is eliminated, and determining the acceleration data of the vehicle in the running process.

With reference to the first aspect, in an eighth possible implementation manner, after interference on the original acceleration data is eliminated, the method further includes:

eliminating interference generated by a vehicle shake from the original acceleration data that is obtained after the interference is eliminated.

With reference to the first aspect, in a ninth possible implementation manner, after the determining acceleration data of the vehicle in the running process, the method further includes:

acquiring Global Positioning System GPS location information of the vehicle, where the GPS location information includes longitude and latitude;

determining acceleration data of the vehicle according to the GPS location information; and correcting the acceleration data of the vehicle in the running process by using the acceleration data of the vehicle determined according to the GPS location information.

With reference to the first aspect, in a tenth possible implementation manner, after the determining acceleration data of the vehicle in the running process, the method further includes:

acquiring vehicle velocity data through an OBD interface of the vehicle;

determining acceleration data of the vehicle according to the vehicle velocity data; and correcting the acceleration data of the vehicle in the running process by using the acceleration data of the vehicle determined according to the vehicle velocity data.

With reference to the ninth or the tenth possible implementation manner of the first aspect, in an eleventh possible implementation manner, the correcting the acceleration data of the vehicle in the running process includes:

correcting the acceleration data of the vehicle in the running process by using a Kalman filtering method.

With reference to the first aspect, in a twelfth possible implementation manner, after the determining acceleration data of the vehicle in the running process, the method further includes:

determining the angle of the accelerometer according to the original acceleration data that is obtained after the interference is eliminated, and the acceleration data of the vehicle in the running process.

According to a second aspect, an apparatus for determining a vehicle acceleration is provided, including:

a data acquiring unit, configured to acquire original acceleration data measured by an accelerometer in a running process of a vehicle;

an interference eliminating unit, configured to eliminate, according to the original acceleration data acquired by the data acquiring unit, interference generated by gravity on the original acceleration data, and interference generated, on the original acceleration data, by a change of an angle of the accelerometer caused by moving of the accelerometer relative to the vehicle; and an acceleration determining unit, configured to determine acceleration data of the vehicle in the running process according to original acceleration data that is determined by the interference eliminating unit and is obtained after interference is eliminated.

With reference to the second aspect, in a first possible implementation manner, a data size of the original acceleration data that is measured by the accelerometer and acquired by the data acquiring unit is less than a preset threshold value.

With reference to the second aspect, in a second possible implementation manner, the original acceleration data that is measured by the accelerometer and acquired by the data acquiring unit includes:

acceleration data, measured by the accelerometer, in three axial directions of the accelerometer separately; and the acceleration data, determined by the acceleration determining unit, of the vehicle in the running process includes:

acceleration data in a straight ahead direction of the vehicle, acceleration data in a side direction that is perpendicular to the straight ahead direction, and acceleration data in a direction that is perpendicular to a plane formed by the straight ahead direction and the side direction.

With reference to the second possible implementation manner of the second aspect, in a third possible implementation manner, the interference eliminating unit is specifically configured to:

determine, according to the original acceleration data, data that is used to indicate a direction of a gravitational acceleration in coordinate system space constituted by the three axial directions of the accelerometer;

determine, according to the data that is used to indicate the direction of the gravitational acceleration in the coordinate system space constituted by the three axial directions of the accelerometer and magnitude of the gravitational acceleration, acceleration components of the gravitational acceleration in the three axial directions of the accelerometer; and respectively subtract the acceleration components of the gravitational acceleration in the three axial directions of the accelerometer from the acceleration data, measured by the accelerometer, in the three axial directions of the accelerometer separately, to obtain original acceleration data on which the interference generated by the gravity is eliminated.

With reference to the third possible implementation manner of the second aspect, in a fourth possible implementation manner, the interference eliminating unit is specifically configured to:

performing space curve fitting processing on the original acceleration data to obtain data corresponding to a fitted curve; where the data corresponding to the fitted curve is data that has indicated the direction of the gravitational acceleration in the coordinate system space constituted by the three axial directions of the accelerometer.

With reference to the third possible implementation manner of the second aspect, in a fifth possible implementation manner, the apparatus further includes:

a gravitational acceleration magnitude determining unit, configured to: connect to the interference eliminating unit, and acquire vehicle velocity data through an On-Board Diagnostics OBD interface of the vehicle;

determine, according to the acquired vehicle velocity data, acceleration data measured by the accelerometer when a vehicle velocity is zero; and determine the magnitude of the gravitational acceleration according to the acceleration data measured by the accelerometer when the vehicle velocity is zero.

With reference to the second aspect, in a sixth possible implementation manner, the interference eliminating unit is specifically configured to:

process the original acceleration data by using a locally linear embedding algorithm, and converting acceleration data measured after the change of the angle of the accelerometer caused by the moving of the accelerometer relative to the vehicle, into acceleration data measured when the angle of the accelerometer remains unchanged.

With reference to the second aspect, in a seventh possible implementation manner, the acceleration determining unit is specifically configured to:

use a matrix to represent the original acceleration data that is obtained after the interference is eliminated; and perform singular value decomposition processing on the original acceleration data that is represented by using the matrix and is obtained after the interference is eliminated, and determine the acceleration data of the vehicle in the running process.

With reference to the second aspect, in an eighth possible implementation manner, the apparatus further includes:

a noise eliminating unit, configured to eliminate interference generated by a vehicle shake from the original acceleration data that is determined by the interference eliminating unit and is obtained after interference is eliminated.

With reference to the second aspect, in a ninth possible implementation manner, the apparatus further includes:

a first correcting unit, configured to: acquire Global Positioning System GPS location information of the vehicle, where the GPS location information includes longitude and latitude;

determine acceleration data of the vehicle according to the GPS location information; and correct the acceleration data, determined by the acceleration determining unit, of the vehicle in the running process by using the acceleration data of the vehicle determined according to the GPS location information.

With reference to the second aspect, in a tenth possible implementation manner, the apparatus further includes:

a second correcting unit, configured to acquire vehicle velocity data through an OBD interface of the vehicle;

determine acceleration data of the vehicle according to the vehicle velocity data; and correct the acceleration data, determined by the acceleration determining unit, of the vehicle in the running process by using the acceleration data of the vehicle determined according to the vehicle velocity data.

With reference to the ninth or the tenth possible implementation manner of the second aspect, in an eleventh possible implementation manner, the first correcting unit or the second correcting unit is specifically configured to:

correct, by using a Kalman filtering method, the acceleration data, determined by the acceleration determining unit, of the vehicle in the running process.

With reference to the second aspect, in a twelfth possible implementation manner, the apparatus further includes:

an angle determining unit, configured to determine the angle of the accelerometer according to the original acceleration data that is determined by the interference eliminating unit and is obtained after the interference is eliminated, and the acceleration data, determined by the acceleration determining unit, of the vehicle in the running process.

According to a third aspect, a terminal device is provided, including:

an accelerometer, configured to measure original acceleration data of a vehicle in a running process of the vehicle; and a processor, configured to: acquire the original acceleration data measured by the accelerometer in the running process of the vehicle; eliminate, according to the acquired original acceleration data, interference generated by gravity on the original acceleration data, and interference generated, on the original acceleration data, by a change of an angle of the accelerometer caused by moving of the accelerometer relative to the vehicle; and determine acceleration data of the vehicle in the running process according to original acceleration data that is obtained after interference is eliminated.

With reference to the third aspect, in a first possible implementation manner, a data size of original acceleration data of the vehicle measured by the accelerometer is less than a preset threshold value.

With reference to the third aspect, in a second possible implementation manner, the original acceleration data measured by the accelerometer specifically includes:

acceleration data, measured by the accelerometer, in three axial directions of the accelerometer separately; and the acceleration data, determined by the processor, of the vehicle in the running process includes:

acceleration data in a straight ahead direction of the vehicle, acceleration data in a side direction that is perpendicular to the straight ahead direction, and acceleration data in a direction that is perpendicular to a plane formed by the straight ahead direction and the side direction.

With reference to the second possible implementation manner of the third aspect, in a third possible implementation manner, the processor is specifically configured to:

determine, according to the original acceleration data, data that is used to indicate a direction of a gravitational acceleration in coordinate system space constituted by the three axial directions of the accelerometer;

determine, according to the data that is used to indicate the direction of the gravitational acceleration in the coordinate system space constituted by the three axial directions of the accelerometer and magnitude of the gravitational acceleration, acceleration components of the gravitational acceleration in the three axial directions of the accelerometer; and respectively subtract the acceleration components of the gravitational acceleration in the three axial directions of the accelerometer from the acceleration data, measured by the accelerometer, in the three axial directions of the accelerometer separately, to obtain original acceleration data on which the interference generated by the gravity is eliminated.

With reference to the third possible implementation manner of the third aspect, in a fourth possible implementation manner, the processor is specifically configured to:

perform space curve fitting processing on the original acceleration data to obtain data corresponding to a fitted curve; where the data corresponding to the fitted curve is data that has indicated the direction of the gravitational acceleration in the coordinate system space constituted by the three axial directions of the accelerometer.

With reference to the third possible implementation manner of the third aspect, in a fifth possible implementation manner, the device further includes an OBD interface, configured to connect to an OBD interface of the vehicle; and the processor is further configured to: acquire vehicle velocity data through the OBD interface; determine, according to the acquired vehicle velocity data, acceleration data measured by the accelerometer when a vehicle velocity is zero; and determine the magnitude of the gravitational acceleration according to the acceleration data measured by the accelerometer when the vehicle velocity is zero.

With reference to the third aspect, in a sixth possible implementation manner, the processor is specifically configured to:

process the original acceleration data by using a locally linear embedding algorithm, and converting acceleration data measured after the change of the angle of the accelerometer caused by the moving of the accelerometer relative to the vehicle, into acceleration data measured when the angle of the accelerometer remains unchanged.

With reference to the third aspect, in a seventh possible implementation manner, the processor is specifically configured to:

use a matrix to represent the original acceleration data that is obtained after the interference is eliminated; and perform singular value decomposition processing on the original acceleration data that is represented by using the matrix and is obtained after the interference is eliminated, and determining the acceleration data of the vehicle in the running process.

With reference to the third aspect, in an eighth possible implementation manner, the processor, after being configured to eliminate interference on the original acceleration data, is further configured to:

eliminate interference generated by a vehicle shake from the original acceleration data that is obtained after the interference is eliminated.

With reference to the third aspect, in a ninth possible implementation manner, the device further includes: a GPS module, configured to measure Global Positioning System GPS location information of the vehicle in the running process of the vehicle, where the GPS location information includes longitude and latitude; and the processor, after being configured to determine the acceleration data of the vehicle in the running process, is further configured to: determine acceleration data of the vehicle according to the GPS location information of the vehicle measured by the GPS module; and correct the acceleration data of the vehicle in the running process by using the acceleration data of the vehicle determined according to the GPS location information.

With reference to the third aspect, in a tenth possible implementation manner, the device further includes: an OBD interface, configured to connect to an OBD interface of the vehicle; and the processor, after being configured to determine the acceleration data of the vehicle in the running process, is further configured to: acquire vehicle velocity data through the OBD interface of the vehicle; determine acceleration data of the vehicle according to the vehicle velocity data; and correct the acceleration data of the vehicle in the running process by using the acceleration data of the vehicle determined according to the vehicle velocity data.

With reference to the ninth or the tenth possible implementation manner of the third aspect, in an eleventh possible implementation manner, when the processor is configured to correct the acceleration data of the vehicle in the running process, the processor is specifically configured to:

correct the acceleration data of the vehicle in the running process by using a Kalman filtering method.

With reference to the third aspect, in a twelfth possible implementation manner, after being configured to determine the acceleration data of the vehicle in the running process, the processor is further configured to:

determine the angle of the accelerometer according to the original acceleration data that is obtained after the interference is eliminated, and the acceleration data of the vehicle in the running process.

According to embodiments of the present invention, interference generated by gravity, and interference generated by a change of an angle of an accelerometer are eliminated from original acceleration data measured by an accelerometer, and the original acceleration data measured by the accelerometer is converted into original acceleration data measured by an accelerometer whose angle is fixed in a gravity-free environment; and after that, acceleration data of a vehicle in a running process is further determined according to original acceleration data that is obtained after the interference is eliminated. In the embodiments of the present invention, a problem in the prior art that the interference generated by the gravity on the original acceleration data measured by the accelerometer, and interference generated by the change of the angle of the accelerometer cannot be accurately eliminated is solved, thereby improving accuracy of the acceleration data of the vehicle in the running process.

DESCRIPTION OF EMBODIMENTS

Embodiments of the present invention provide a method and an apparatus for determining a vehicle acceleration, which are used to eliminate an interference element in original acceleration data measured by an accelerometer, and correct original acceleration data that is obtained after interference is eliminated, into acceleration data of a vehicle, so as to accurately determine acceleration data of the vehicle in a running process.

Figure 1:
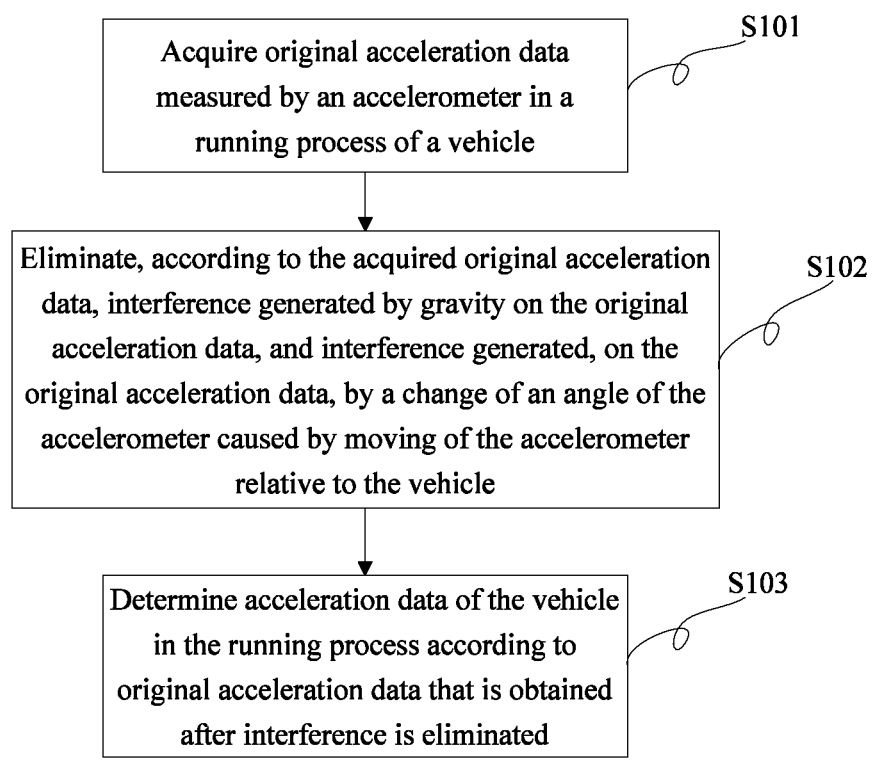
FIG. 1 is a flowchart of a method for determining a vehicle acceleration according to an embodiment of the present invention.

Referring to FIG. 1, a method for determining a vehicle acceleration provided in an embodiment of the present invention includes the following steps:

S101: Acquire original acceleration data measured by an accelerometer in a running process of a vehicle.

A data size of the original acceleration data is less than a preset threshold value, and excessively large data leads to a memory overflow.

When running time of the vehicle is relatively long, the original acceleration data in the running process should be divided according to a period of time, and processing of steps S101 to S103 is separately executed on divided original acceleration data of each period of time, where a length of the original acceleration data of each period of time is less than the preset threshold value.

Specifically, the original acceleration data measured by the accelerometer includes acceleration data, measured by the accelerometer, in three axial directions of the accelerometer separately.

Between steps S101 and S102, processing may further be performed on the original acceleration data to eliminate data that is empty and eliminate data whose size exceeds an actual range.

S102: Eliminate, according to the acquired original acceleration data, interference generated by gravity on the original acceleration data, and interference generated, on the original acceleration data, by a change of an angle of the accelerometer caused by moving of the accelerometer relative to the vehicle.

Because the original acceleration data measured by the accelerometer is interfered with by a gravitational acceleration, a gravitational acceleration element in the original acceleration data needs to be removed. In addition, in the running process of the vehicle, the accelerometer may encounter a change of a placing angle because of reasons such as touch of a person and sliding by accident, the change of the placing angle causes a change of three axial directions of the accelerometer. In this case, even if a running acceleration of the vehicle does not change, the original acceleration data measured by the accelerometer may change. Therefore, interference generated by the change of the angle of the accelerometer should further be eliminated.

In step S102, when the interference generated by the gravity is eliminated from the original acceleration data measured by the accelerometer, components of the gravitational acceleration separately in the three axial directions of the accelerometer need to be determined, specifically including: determining, according to the original acceleration data, data that is used to indicate a direction of the gravitational acceleration in coordinate system space constituted by the three axial directions of the accelerometer; determining, according to the data that is used to indicate the direction of the gravitational acceleration in the coordinate system space constituted by the three axial directions of the accelerometer and magnitude of the gravitational acceleration, acceleration components of the gravitational acceleration in the three axial directions of the accelerometer; and respectively subtracting the acceleration components of the gravitational acceleration in the three axial directions of the accelerometer from the acceleration data, measured by the accelerometer, in the three axial directions of the accelerometer separately, to obtain original acceleration data on which the interference generated by the gravity is eliminated.

The determining, according to the original acceleration data, data that is used to indicate a direction of the gravitational acceleration in coordinate system space constituted by the three axial directions of the accelerometer includes: performing space curve fitting processing on the original acceleration data to obtain data corresponding to a fitted curve; where the data corresponding to the fitted curve is data that has indicated the direction of the gravitational acceleration in the coordinate system space constituted by the three axial directions of the accelerometer. Space curve fitting may be implemented by using multiple algorithms, and a commonly used algorithm is polynomial curve fitting.

The magnitude of the gravitational acceleration may be obtained by using the following manner: acquiring vehicle velocity data through an On-Board Diagnostics (OBD) interface of the vehicle; determining, according to the acquired vehicle velocity data, a reading of an acceleration measured by the accelerometer when a vehicle velocity is zero; and determining, according to the acceleration data measured by the accelerometer when the vehicle velocity is zero, the magnitude of the gravitational acceleration. An interface provided by an OBD system is a standard physical 16-pin interface. Through this OBD interface, a query instruction may be sent to a bus inside the vehicle, so as to obtain status information of a power system of the vehicle. Typical OBD data includes a vehicle velocity, engine rotation speed, and the like.

In addition, the magnitude of the gravitational acceleration may be also obtained by using manners such as querying a prestored record of magnitude of a gravitational acceleration of each place or using manual input by a user.

In step S102, the eliminating interference generated, on the original acceleration data, by a change of an angle of the accelerometer caused by moving of the accelerometer relative to the vehicle includes: processing the original acceleration data by using a locally linear embedding (Locally Linear Embedding, LLE) algorithm, and converting acceleration data measured after the change of the angle of the accelerometer caused by the moving of the accelerometer relative to the vehicle, into acceleration data measured when the angle of the accelerometer remains unchanged. Based on an assumption that the vehicle acceleration should continuously change, the LLE algorithm is used to perform adaptive adjusting on the measured data, so as to obtain original acceleration data corresponding to an initial placing angle of the accelerometer.

The foregoing two processing steps are performed regardless of sequence. It may be that the interface generated by the gravity is first eliminated from the original acceleration data, and then, the interference generated by the change of the placing angle of the accelerometer is eliminated; and it may also be that the interference generated by the change of the placing angle of the accelerometer is first eliminated from the original acceleration data, and then, the interface generated by the gravity is eliminated.

The original acceleration data that is obtained after the interference is eliminated and that is obtained after undergoing processing of step S102, is equivalent to original acceleration data measured by an accelerometer that is placed at a fixed angle in the vehicle in a gravity-free environment.

In addition, after the interference on the original acceleration data is eliminated, interference generated by a vehicle shake may further be eliminated from the original acceleration data that is obtained after the interference is eliminated. The vehicle may encounter a shake at a relatively high frequency in the running process, and by using a Daubechies (Daubechies) wavelet basis to perform wavelet transform on the processed original acceleration data and eliminate an element of more than two hierarchies, interference of a vehicle shake on the original acceleration data can be reduced. This step may be executed before step S102, and may also be executed after step S102 and before S103.

S103: Determine acceleration data of the vehicle in the running process according to original acceleration data that is obtained after interference is eliminated.

Finally obtained acceleration data of the vehicle in the running process includes: acceleration data in a straight ahead direction of the vehicle, acceleration data in a side direction that is perpendicular to the straight ahead direction, and acceleration data in a direction that is perpendicular to a plane formed by the straight ahead direction and the side direction.

Step S103 specifically includes: using a matrix to represent the original acceleration data that is obtained after the interference is eliminated; and performing singular value decomposition processing on the original acceleration data that is represented by using the matrix and is obtained after the interference is eliminated, and determining the acceleration data of the vehicle in the running process. Based on an assumption that in the running process of the vehicle, an acceleration in the straight ahead direction is primary, an acceleration in the side direction is secondary, and an acceleration in the vertical direction is the least, a manner of singular value decomposition is used to correct original acceleration data corresponding to the three axial directions of the accelerometer into acceleration data corresponding to the straight ahead direction, the side direction, and the vertical direction of the vehicle. In addition, conversion from acceleration data corresponding to the three axial directions of the accelerometer into the acceleration data in the straight ahead direction, the side direction, and the vertical direction of the vehicle may be implemented by measuring and calculating the initial placing angle of the accelerometer.

The embodiment of the present invention, after step S103, further includes: using Global Positioning System (Global Positioning System, GPS) location information and/or OBD data to correct the acceleration data obtained in S103.

Specifically, a method for using the GPS location information to correct the obtained acceleration data includes: acquiring Global Positioning System GPS location information of the vehicle, where the GPS location information includes longitude and latitude; determining the acceleration data of the vehicle according to the GPS location information; and correcting the acceleration data of the vehicle in the running process by using the acceleration data of the vehicle determined according to the GPS location information. Because the GPS location information is measurement data on a two-dimension plane, an acceleration of the vehicle on a horizontal plane can only be roughly calculated according to the GPS location information. A specific calculation method is as follows: performing second order difference on each piece of GPS data corresponding to adjacent time points to obtain the acceleration data of the vehicle corresponding to the GPS data, and after that, correcting the acceleration data, obtained in step S103, in the straight ahead direction and the side direction of the vehicle by using the acceleration data of the vehicle obtained according to the GPS location information.

Preferably, after the GPS location information of the vehicle is acquired, noise data in the GPS location information is first eliminated; and the acceleration data of the vehicle is determined according to GPS location information that is obtained after the noise data is eliminated.

Specifically, a method for using the OBD data to correct the obtained acceleration data includes: acquiring the vehicle velocity data through the OBD interface of the vehicle; determining the acceleration data of the vehicle according to the vehicle velocity data; and correcting the acceleration data of the vehicle in the running process by using the acceleration data of the vehicle determined according to the vehicle velocity data. The acceleration data is specifically obtained by performing first order difference on each piece of vehicle velocity data corresponding to adjacent time points. Because the vehicle runs on a horizontal road surface toward the straight ahead direction in most time, the acceleration data, obtained in S103, in the straight ahead direction of the vehicle in the running process can be corrected by using the acceleration data of the vehicle obtained according to the vehicle velocity data.

Preferably, after the vehicle velocity data is acquired, noise data in the vehicle velocity data is first eliminated; and then, the acceleration data of the vehicle is determined according to vehicle velocity data that is obtained after the noise data is eliminated. The noise data in the vehicle velocity data may be eliminated by using the wavelet transform.

Further, when the acceleration data, obtained in step S103, in the straight ahead direction and the side direction is corrected, a Kalman filtering method is used. An exemplary implementation manner is as follows: when the acceleration data, obtained in step S103, in the straight ahead direction is corrected, at the same time, inputting the acceleration data of the vehicle obtained according to the GPS data, the acceleration data of the vehicle obtained according to the OBD data, and the acceleration data, obtained in step S103, in the straight ahead direction, into a Kalman filter.

Preferably, after step S103 is executed, the placing angle of the accelerometer is determined according to the original acceleration data that is obtained after the interference is eliminated, and the acceleration data of the vehicle in the running process.

Figure 2:
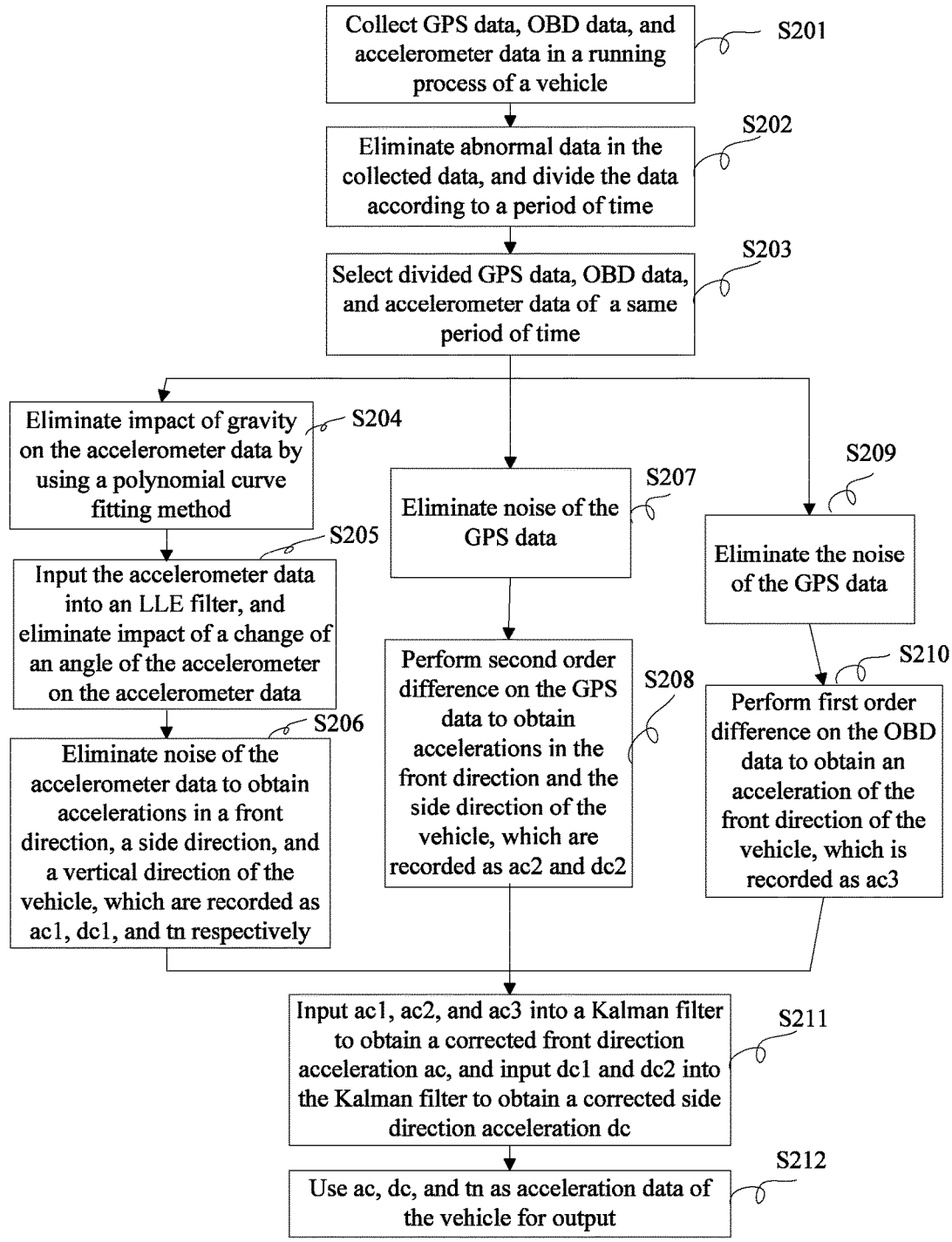
FIG. 2 is a flowchart of a method for determining a vehicle acceleration according to another embodiment of the present invention.

Referring to FIG. 2, a method for determining a vehicle acceleration provided in a specific embodiment of the present invention includes the following steps:

S201: Collect GPS data, OBD data, and accelerometer data in a running process of a vehicle.

S202: Eliminate abnormal data in the collected data, and divide the data according to a period of time.

S203: Select divided GPS data, OBD data, and accelerometer data of a same period of time.

S204: Eliminate interference generated by gravity on the accelerometer data by using a polynomial curve fitting method.

S205: Input the accelerometer data into an LLE filter, and eliminate interference generated by a change of an angle of the accelerometer on the accelerometer data.

S206: Eliminate noise of the accelerometer data to obtain accelerations in a straight ahead direction, a side direction, and a vertical direction of the vehicle, which are recorded as ac1, dc1, and tn respectively.

S207: Eliminate noise of the GPS data.

S208: Perform second order difference on the GPS data to obtain accelerations in the straight ahead direction and the side direction of the vehicle, which are recorded as ac2 and dc2.

S209: Eliminate noise of the OBD data.

S210: Perform first order difference on the OBD data to obtain an acceleration of the straight ahead direction of the vehicle, which is recorded as ac3.

S211: Input ac1, ac2, and ac3 into a Kalman filter to obtain a corrected straight ahead direction acceleration ac, and input dc1 and dc2 into the Kalman filter to obtain a corrected side direction acceleration dc.

S212: Use ac, dc, and tn as acceleration data of the vehicle for output.

It should be noted that steps S204 to S206, steps S207 to S208, and steps S209 to S210 are executed regardless of sequence, and may be executed at the same time.

The following describes an implementation manner of steps S201 to S212 with reference to a service application related to acceleration data.

Figure 3:
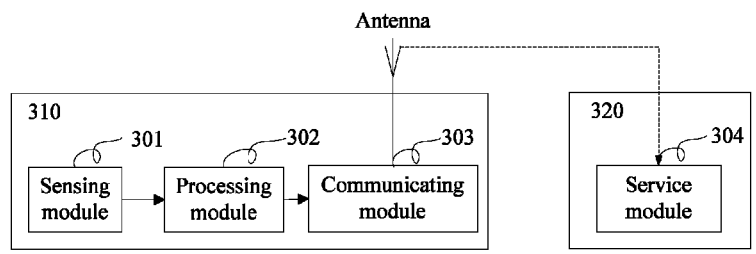
FIG. 3 is a schematic structural diagram of a system corresponding to an embodiment of the present invention.

Implementation Manner 1:

The accelerometer and a GPS module are integrated in an OBD terminal, the OBD terminal is connected to a bus inside the vehicle through an OBD interface of the vehicle, and the OBD terminal and the OBD interface of the vehicle may be specifically connected by using a data cable. In this case, it is convenient to place the OBD terminal randomly at a proper location that has a strong GPS signal inside the vehicle. Referring to FIG. 3, an OBD terminal 310 includes a sensing module 301, configured to execute step S201, and collect the GPS data, the accelerometer data, and the OBD data; and further includes a processing module 302, configured to execute steps S202 to S212, preliminarily determine vehicle acceleration data, and correct, according to the GPS data and the OBD data, the preliminarily determined vehicle acceleration data. After the processing module 302 obtains, through calculation, corrected vehicle acceleration data, an antenna of a communicating module 303 transmits the vehicle acceleration data to a remote platform 320, and a service module 304 of the platform 320 performs subsequent processing, such as acceleration data storage and driver behavior analysis. An insurance service is used as an example. When the platform, after analyzing the acceleration data, considers a driving behavior safety coefficient of a driver as relatively high, the driver may obtain a relatively high vehicle insurance discount.

Figure 4:
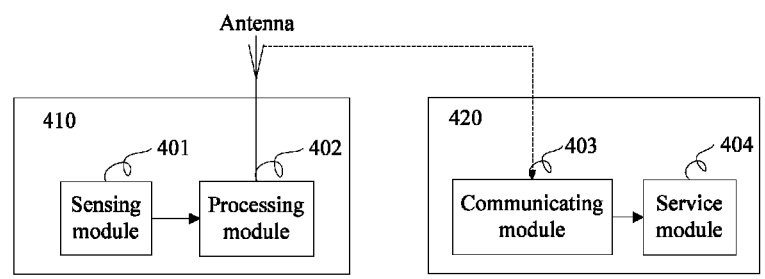
FIG. 4 is a schematic structural diagram of a system corresponding to another embodiment of the present invention.

Implementation Manner 2:

The accelerometer and a GPS module are integrated in an OBD terminal, the OBD terminal is connected to a bus inside the vehicle through an OBD interface of the vehicle, and the OBD terminal and the OBD interface of the vehicle may be specifically connected by using a data cable. Referring to FIG. 4, an OBD terminal 410 further includes a sensing module 401 and a communicating module 402; the sensing module 401 is configured to execute step S201 and collect the GPS data, the accelerometer data, and the OBD data; the communicating module 402 is configured to directly transmit the GPS data collected by the sensing module 401 to a platform 420, a processing module 403 of the platform 420 performs processing of steps S202 to S212 on the data transmitted by the communicating module 402 to obtain the acceleration data of the vehicle, and a service module 404 performs subsequent processing, such as acceleration data storage and driver behavior analysis, on the acceleration data of the vehicle.

Compared with the implementation manner 1, in the implementation manner 2, a processing module is disposed on a remote platform, which lowers data process stress of the OBD terminal.

Figure 5:
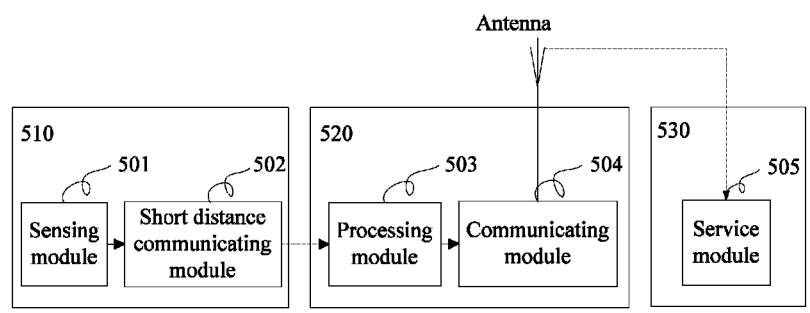
FIG. 5 is a schematic structural diagram of a system corresponding to another embodiment of the present invention.

Implementation Manner 3:

The accelerometer and a GPS module are integrated in an OBD terminal, the OBD terminal is connected to a bus inside the vehicle through an OBD interface of the vehicle, and the OBD terminal and the OBD interface of the vehicle may be specifically connected by using a data cable. Referring to FIG. 5, the OBD terminal 510 further includes a sensing module 501 and a short distance communicating module 502, and the short distance communicating module 502 may be any one of the following modules: a Bluetooth module and a wireless communicating module (WiFi); and the sensing module 501 is configured to execute step S201 and collect the GPS data, the accelerometer data, and the OBD data, and the short distance communicating module 502 is configured to transmit the data collected by the sensing module 501 to a mobile phone 520. After the mobile phone 520 receives the data transmitted by the short distance communicating module 502, a process module 503 of the mobile phone 520 performs processing on the received data and executes steps S202 to S212 to obtain the acceleration data of the vehicle, a communicating module 504 of the mobile phone 520 transmits the acceleration data of the vehicle to a platform 530, and a service module 505 of the platform 530 performs subsequent processing, such as acceleration data storage and driver behavior analysis.

Figure 6:
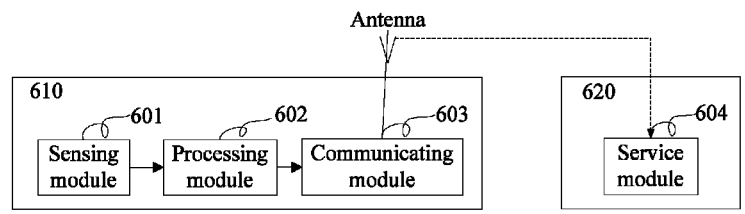
FIG. 6 is a schematic structural diagram of a system corresponding to another embodiment of the present invention.

Implementation Manner 4:

A vehicle-mounted smart terminal is improved, and the accelerometer and a GPS module are integrated in the vehicle-mounted smart terminal. Referring to FIG. 6, a vehicle-mounted smart terminal 610 further includes: a sensing module 601, a processing module 602, and a communicating module 603; the sensing module 601 is configured to execute step S201 and collect the GPS data, the accelerometer data, and the OBD data, the processing module 602 is configured to the acceleration data of the vehicle according to the data collected by the sensing module 601, and the communicating module 603 is configured to transmit a result obtained through calculation by the processing module 602 to a service module 604 of a platform 620, so as to perform acceleration data storage and service analysis. In this implementation manner, the vehicle-mounted smart terminal 610 can directly query a bus inside the vehicle to acquire the OBD data, and can feed back determined acceleration data to a driver in real time.

Figure 7:
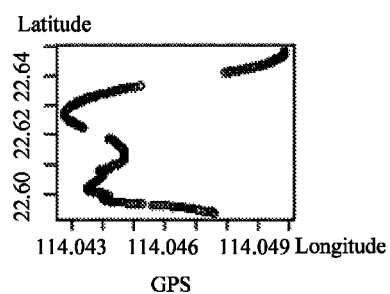
FIG. 7 is a schematic diagram of collected GPS data.
Figure 8:
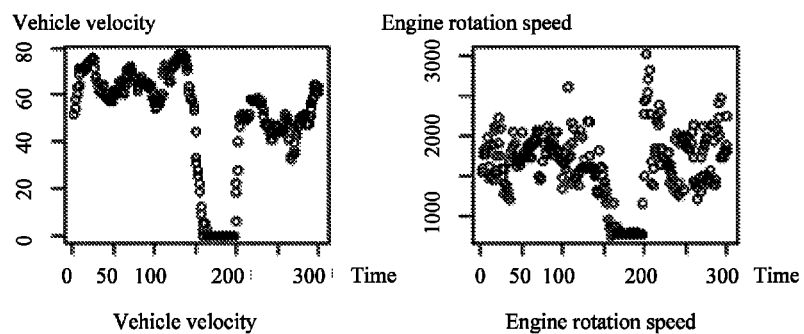
FIG. 8 is a schematic diagram of collected OBD data.
Figure 9:
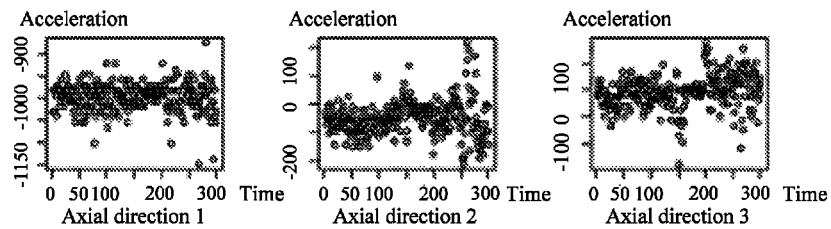
FIG. 9 is a schematic diagram of measurement data, obtained through collection, of an accelerometer in test 1.
Figure 10:
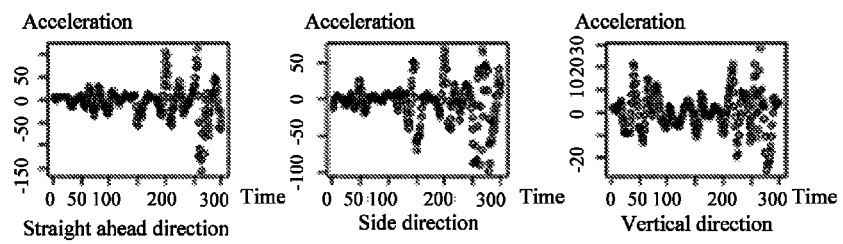
FIG. 10 is a schematic diagram of vehicle acceleration data determined in test 1.

The OBD terminal corresponding to the implementation manner 1 is used to perform a test of determining the vehicle acceleration, and a specific test result is as follows:

Test 1: GPS data and OBD data (vehicle velocity and engine rotation speed) collected at the same time in the running process of the vehicle are respectively shown in FIG. 7 and FIG. 8; and measurement data collected at the same in three axial directions of the accelerometer is shown in FIG. 9. After operation processing of the processing module of the OBD terminal, final vehicle acceleration data is obtained, as shown in FIG. 10. It may be seen that FIG. 10 can clearly and coherently express a change of the acceleration in the running process. In addition, GPS data and OBD data restored according to the accelerometer data are basically consistent with original GPS data and OBD data, which further verifies accuracy of the determined acceleration data of the vehicle.

Figure 11:
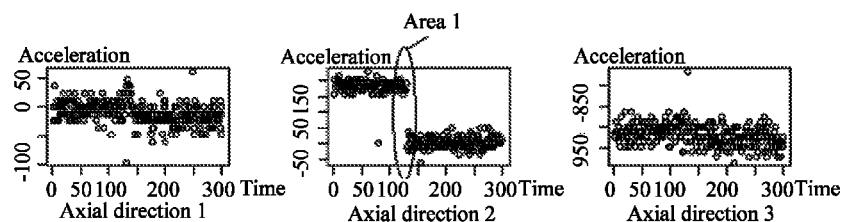
FIG. 11 is a schematic diagram of measurement data, obtained through collection, of an accelerometer in test 2.
Figure 12:
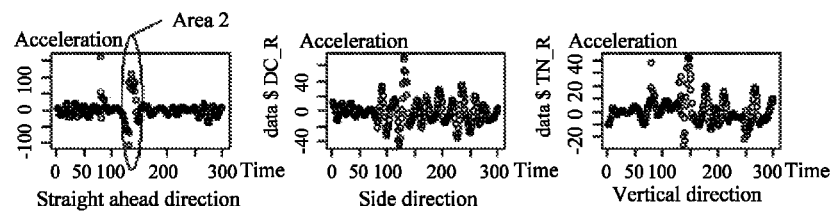
FIG. 12 is a schematic diagram of vehicle acceleration data determined in test 2.

Test 2: In a process of stable running toward a straight ahead direction, a placing angle of the OBD terminal is changed by a person; and referring to an area 1 in FIG. 11, it may be seen that an acceleration in an axial direction of the accelerometer encounters a sudden change, and data obtained in this axial direction after the sudden change differs greatly from that before the sudden change. However, referring to FIG. 12, an acceleration finally obtained is not greatly affected. As shown in an area 2, data encounters a sudden change only within a short period of time of reversing the OBD terminal, and after that, the data returns to a normal level. This testing proves that the OBD terminal provided in the embodiment of the present invention can accurately determine acceleration data of a vehicle when a placing angle encounters a change in a running process.

Figure 13:
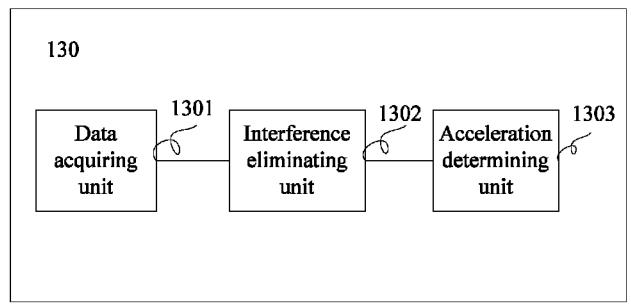
FIG. 13 is a structural diagram of an apparatus 130 for determining a vehicle acceleration according to an embodiment of the present invention.

Referring to FIG. 13, an apparatus 130 for determining a vehicle acceleration provided in an embodiment of the present invention includes:

a data acquiring unit 1301, configured to acquire original acceleration data measured by an accelerometer in a running process of a vehicle;

an interference eliminating unit 1302, configured to eliminate, according to the original acceleration data acquired by the data acquiring unit 1301, interference generated by gravity on the original acceleration data, and interference generated, on the original acceleration data, by a change of an angle of the accelerometer caused by moving of the accelerometer relative to the vehicle; and an acceleration determining unit 1303, configured to determine acceleration data of the vehicle in the running process according to original acceleration data that is determined by the interference eliminating unit 1302 and is obtained after interference is eliminated.

A data size of the original acceleration data that is measured by the accelerometer and acquired by the data acquiring data 1301 is less than a preset threshold value.

The original acceleration data that is measured by the accelerometer and acquired by the data acquiring unit 1301 includes acceleration data, measured by the accelerometer, in three axial directions of the accelerometer separately.

The acceleration data of the vehicle in the running process determined by the acceleration determining unit 1303 includes: acceleration data in a straight ahead direction of the vehicle, acceleration data in a side direction that is perpendicular to the straight ahead direction, and acceleration data in a direction that is perpendicular to a plane formed by the straight ahead direction and the side direction.

The interference eliminating unit 1302 is specifically configured to:

determine, according to the original acceleration data, data that is used to indicate a direction of a gravitational acceleration in coordinate system space constituted by the three axial directions of the accelerometer;

determine, according to the data that is used to indicate the direction of the gravitational acceleration in the coordinate system space constituted by the three axial directions of the accelerometer and magnitude of the gravitational acceleration, acceleration components of the gravitational acceleration in the three axial directions of the accelerometer; and respectively subtract the acceleration components of the gravitational acceleration in the three axial directions of the accelerometer from the acceleration data, measured by the accelerometer, in three axial directions of the accelerometer separately, to obtain original acceleration data on which the interference generated by the gravity is eliminated.

The interference eliminating unit 1302 is specifically configured to:

perform space curve fitting processing on the original acceleration data to obtain data corresponding to a fitted curve; where the data corresponding to the fitted curve is data that has indicated the direction of the gravitational acceleration in the coordinate system space constituted by the three axial directions of the accelerometer.

The apparatus 130 further includes:

a gravitational acceleration magnitude determining unit, configured to: connect to the interference eliminating unit, and acquire vehicle velocity data through an On-Board Diagnostics OBD interface of the vehicle;

determine, according to the acquired vehicle velocity data, acceleration data measured by the accelerometer when a vehicle velocity is zero; and determine the magnitude of the gravitational acceleration according to the acceleration data measured by the accelerometer when the vehicle velocity is zero.

The interference eliminating unit 1302 is specifically configured to:

process the original acceleration data by using a locally linear embedding algorithm, and converting acceleration data measured after the change of the angle of the accelerometer caused by the moving of the accelerometer relative to the vehicle, into acceleration data measured when the angle of the accelerometer remains unchanged.

The acceleration determining unit 1303 is specifically configured to:

use a matrix to represent the original acceleration data that is obtained after the interference is eliminated; and perform singular value decomposition processing on the original acceleration data that is represented by using the matrix and is obtained after the interference is eliminated, and determining the acceleration data of the vehicle in the running process.

The apparatus 130 further includes a noise eliminating unit, configured to eliminate interference generated by a vehicle shake from the original acceleration data that is determined by the interference eliminating unit and is obtained after the interference is eliminated.

The apparatus 130 further includes a first correcting unit, configured to: acquire Global Positioning System GPS location information of the vehicle, where the GPS location information includes longitude and latitude;

determine acceleration data of the vehicle according to the GPS location information; and correct the acceleration data of the vehicle in the running process determined by the acceleration determining unit by using the acceleration data of the vehicle determined according to the GPS location information.

The apparatus 130 further includes a second correcting unit, configured to: acquire vehicle velocity data through an OBD interface of the vehicle;

determine acceleration data of the vehicle according to the vehicle velocity data; and correct the acceleration data, determined by the acceleration determining unit, of the vehicle in the running process by using the acceleration data of the vehicle determined according to the vehicle velocity data.

When the first correcting unit or the second correcting unit corrects the acceleration data of the vehicle in the running process, specifically, a Kalman filtering method is used.

The apparatus 130 further includes an angle determining unit, configured to determine the angle of the accelerometer according to the original acceleration data that is determined by the interference eliminating unit and is obtained after the interference is eliminated, and the acceleration data, determined by the acceleration determining unit, of the vehicle in the running process.

It should be noted that the apparatus for determining the vehicle acceleration in this embodiment is to implement the foregoing steps S101 to S103, and the foregoing explanation of and limitation on the method are also applicable to the apparatus for determining the vehicle acceleration in this embodiment.

Figure 14:
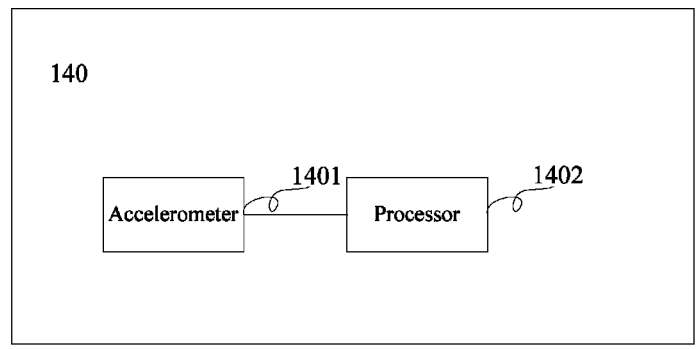
FIG. 14 is a structural diagram of a terminal device 140 according to an embodiment of the present invention.

Referring to FIG. 14, a terminal device 140 provided in the present invention includes:

an accelerometer 1401, configured to measure original acceleration data of a vehicle in a running process of the vehicle; and a processor 1402, configured to: acquire original acceleration data measured by the accelerometer in the running process of the vehicle; eliminate, according to the acquired original acceleration data, interference generated by gravity on the original acceleration data, and interference generated, on the original acceleration data, by a change of an angle of the accelerometer caused by moving of the accelerometer relative to the vehicle; and determine acceleration data of the vehicle in the running process according to original acceleration data that is obtained after interference is eliminated.

A data size of the original acceleration data of the vehicle measured by the accelerometer 1401 is less than a preset threshold value.

The original acceleration data measured by the accelerometer 1401 specifically includes acceleration data, measured by the accelerometer, in three axial directions of the accelerometer separately.

The acceleration data, determined by processor 1402, of the vehicle in the running process includes:

acceleration data in a straight ahead direction of the vehicle, acceleration data in a side direction that is perpendicular to the straight ahead direction, and acceleration data in a direction that is perpendicular to a plane formed by the straight ahead direction and the side direction.

The processor 1402 is specifically configured to:

determine, according to the original acceleration data, data that is used to indicate a direction of a gravitational acceleration in coordinate system space constituted by the three axial directions of the accelerometer;

determine, according to the data that is used to indicate the direction of the gravitational acceleration in the coordinate system space constituted by the three axial directions of the accelerometer and magnitude of the gravitational acceleration, acceleration components of the gravitational acceleration in the three axial directions of the accelerometer; and respectively subtract the acceleration components of the gravitational acceleration in the three axial directions of the accelerometer from the acceleration data, measured by the accelerometer, in three axial directions of the accelerometer separately, to obtain original acceleration data on which the interference generated by the gravity is eliminated.

The processor 1402 is specifically configured to:

perform space curve fitting processing on the original acceleration data to obtain data corresponding to a fitted curve; where the data corresponding to the fitted curve is data that has indicated the direction of the gravitational acceleration in the coordinate system space constituted by the three axial directions of the accelerometer.

Figure 15:
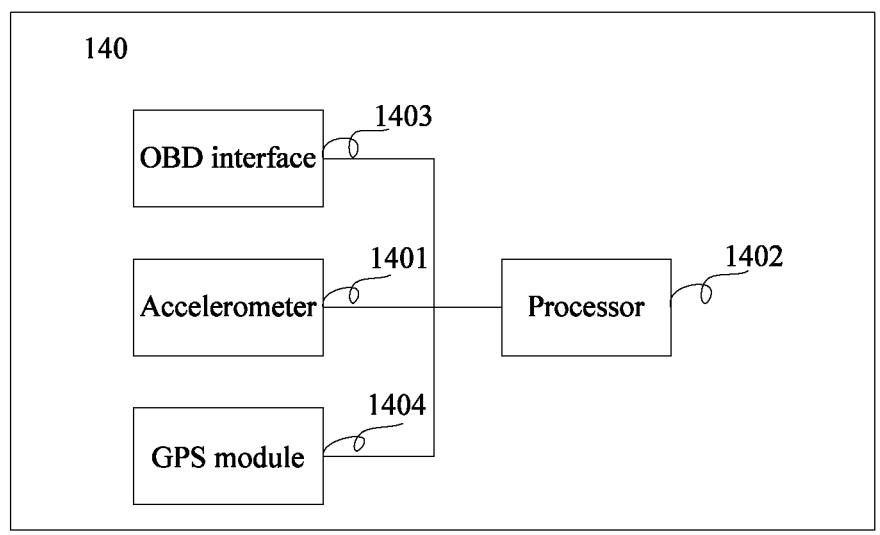
FIG. 15 is a structural diagram of a terminal device 140 according to another embodiment of the present invention.

Referring to FIG. 15, the terminal device 140 further includes: an OBD interface 1403, configured to connect to an OBD interface of the vehicle.

The processor 1402 is further configured to acquire vehicle velocity data through the OBD interface 1403, and determine, according to the acquired vehicle velocity data, acceleration data measured by the accelerometer when a vehicle velocity is zero; and determine magnitude of the gravitational acceleration according to the acceleration data measured by the accelerometer when the vehicle velocity is zero.

The processor 1402 is specifically configured to:

process the original acceleration data by using a locally linear embedding algorithm, and converting acceleration data measured after the change of the angle of the accelerometer caused by the moving of the accelerometer relative to the vehicle, into acceleration data measured when the angle of the accelerometer remains unchanged.

The processor 1402 is specifically configured to:

use a matrix to represent the original acceleration data that is obtained after the interference is eliminated; and perform singular value decomposition processing on the original acceleration data that is represented by using the matrix and is obtained after the interference is eliminated, and determining the acceleration data of the vehicle in the running process.

The processor 1402, after being configured to eliminate interference on the original acceleration data, is further configured to eliminate interference generated by a vehicle shake from the original acceleration data that is obtained after the interference is eliminated.

As shown in FIG. 15, the terminal device 140 further includes: a GPS module 1404, configured to measure Global Positioning System GPS location information of the vehicle in the running process of the vehicle, where the GPS location information includes longitude and latitude; and the processor 1402, after being configured to determine the acceleration data of the vehicle in the running process, is further configured to: determine acceleration data of the vehicle according to the GPS location information; and correct the acceleration data of the vehicle in the running process by using the acceleration data of the vehicle determined according to the GPS location information.

The processor 1402, after being configured to determine the acceleration data of the vehicle in the running process, is further configured to: acquire the vehicle velocity data through the OBD interface 1403 of the vehicle; determine the acceleration data of the vehicle according to the vehicle velocity data; and correct the acceleration data of the vehicle in the running process by using the acceleration data of the vehicle determined according to the vehicle velocity data.

The processor 1402 is specifically configured to:

correct the acceleration data of the vehicle in the running process by using a Kalman filtering method.

The processor 1402, after being configured to determine the acceleration data of the vehicle in the running process, is further configured to:

determine the angle of the accelerometer according to the original acceleration data that is obtained after the interference is eliminated, and the acceleration data of the vehicle in the running process.

In conclusion, according to the embodiments of the present invention, processing of eliminating interference of gravity and eliminating interference caused by a change of a placing angle of an accelerometer is performed on original acceleration data measured by the accelerometer, so as to obtain an effective element in data of the accelerometer, and correction is performed to determine a vehicle acceleration. In this case, interference generated by factor is eliminated, and accuracy of the determined vehicle acceleration is relatively high. In addition, the determined vehicle acceleration may further be corrected with reference to OBD data and GPS location information, so as to further improve the accuracy of the determined vehicle acceleration.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method for determining a vehicle acceleration, comprising:
acquiring first acceleration data measured by an accelerometer in a running process of a vehicle;
determining, separately from the first acceleration data, gravitational acceleration data that is different from the first acceleration data and that includes directional data that corresponds to a fitted curve and further includes magnitude data corresponding to an acceleration measured by the accelerometer when a velocity of the vehicle is zero;
generating second acceleration data by eliminating, according to the first acceleration data, interference generated by gravity on the first acceleration data by subtracting the gravitational acceleration data from the first acceleration data, and further by eliminating interference generated, on the first acceleration data, by a change of an angle of the accelerometer caused by moving of the accelerometer relative to the vehicle by using adaptive adjustment on the first acceleration data; and
determining third acceleration data of the vehicle in the running process according to the second acceleration data that is obtained after interference is eliminated.

2. The method according to claim 1, wherein the first acceleration data measured by the accelerometer comprises acceleration data, measured separately by the accelerometer, in three axial directions of the accelerometer; and
wherein the third acceleration data of the vehicle in the running process comprises acceleration data in a first direction relative to the vehicle, acceleration data in a second direction that is perpendicular to the first direction, and acceleration data in a third direction that is perpendicular to a plane formed by the first direction and the second direction, wherein the first direction is parallel to a forward direction of travel of the vehicle.

3. The method according to claim 2, wherein the eliminating the interference generated by gravity on the first acceleration data comprises:
determining, according to the first acceleration data, the directional data, which indicates a direction of a gravitational acceleration in coordinate system space constituted by the three axial directions of the accelerometer;
determining, according to the gravitational acceleration data and a magnitude of the gravitational acceleration, acceleration components of the gravitational acceleration in the three axial directions of the accelerometer; and
respectively subtracting the acceleration components of the gravitational acceleration in the three axial directions of the accelerometer from the first acceleration data.

4. The method according to claim 3, wherein the determining the gravitational acceleration data comprises:
performing space curve fitting processing on the first acceleration data to obtain the directional data, wherein the directional data indicates the direction of the gravitational acceleration in the coordinate system space constituted by the three axial directions of the accelerometer.

5. The method according to claim 3, wherein the determining the gravitational acceleration data comprises:
acquiring vehicle velocity data through an On-Board Diagnostics (OBD) interface of the vehicle;
determining, according to the acquired vehicle velocity data, fourth acceleration data measured by the accelerometer when the velocity of the vehicle is zero; and
determining the magnitude data of the gravitational acceleration data according to the fourth acceleration data.

6. The method according to claim 1, wherein the eliminating interference generated by a change of an angle of the accelerometer comprises:
processing the first acceleration data by using a locally linear embedding algorithm, and converting acceleration data measured after the change of the angle of the accelerometer caused by the moving of the accelerometer relative to the vehicle, into acceleration data measured when the angle of the accelerometer remains unchanged.

7. The method according to claim 1, wherein the determining the third acceleration data comprises:
using a matrix to represent the second acceleration data; and
determining the third acceleration data by performing singular value decomposition processing on the second acceleration data that is represented by using the matrix.

8. The method according to claim 1, further comprising performing, after generating the second acceleration data:
eliminating interference generated by a vehicle shake from the second acceleration data.

9. The method according to claim 1, further comprising performing, after acquiring the third acceleration data:
acquiring Global Positioning System (GPS) location information of the vehicle, wherein the GPS location information comprises longitude and latitude;
determining GPS acceleration data of the vehicle according to the GPS location information; and
correcting the third acceleration data by using the GPS acceleration data of the vehicle determined according to the GPS location information.

10. The method according to claim 1, further comprising performing, after acquiring the third acceleration data:
acquiring vehicle velocity data through an OBD interface of the vehicle;
determining velocity-based acceleration data of the vehicle according to the vehicle velocity data; and
correcting the third acceleration data by using the velocity-based acceleration data.

11. The method according to claim 9, wherein the correcting the first acceleration data comprises:
correcting the third acceleration data of the vehicle in the running process by using a Kalman filtering method.

12. A terminal device, comprising:
an accelerometer, configured to measure first acceleration data of a vehicle in a running process of the vehicle;
a processor; and
a non-transitory computer-readable storage medium storing a program to be executed by the processor, the program including instructions to:
acquire the first acceleration data measured by the accelerometer in the running process of the vehicle;
determine, separately from the first acceleration data, gravitational acceleration data that is different from the first acceleration data and that includes directional data that corresponds to a fitted curve and further includes magnitude data corresponding to an acceleration measured by the accelerometer when a velocity of the vehicle is zero;
generate second acceleration data by eliminating, according to the first acceleration data, interference generated by gravity on the first acceleration data by subtracting the gravitational acceleration data from the first acceleration data, and further by eliminating interference generated, on the first acceleration data, by a change of an angle of the accelerometer caused by moving of the accelerometer relative to the vehicle by using adaptive adjustment on the first acceleration data; and
determine third acceleration data of the vehicle in the running process according to the second acceleration data that is obtained after interference is eliminated.

13. The device according to claim 12, wherein the first acceleration data measured by the accelerometer comprises acceleration data, measured separately by the accelerometer, in three axial directions of the accelerometer; and
wherein the third acceleration data comprises acceleration data in a first direction relative to the vehicle, acceleration data in a second direction that is perpendicular to the first direction, and acceleration data in a third direction that is perpendicular to a plane formed by the first direction and the second direction, wherein the first direction is parallel to a forward direction of travel of the vehicle.

14. The device according to claim 13, wherein the instructions to generate second acceleration data by eliminating, according to the first acceleration data, interference generated by gravity on the first acceleration data include instructions to:
determine, according to the first acceleration data, the directional data which indicates a direction of a gravitational acceleration in coordinate system space constituted by the three axial directions of the accelerometer;
determine, according to the gravitational acceleration data and a magnitude of the gravitational acceleration, acceleration components of the gravitational acceleration in the three axial directions of the accelerometer; and
respectively subtract the acceleration components of the gravitational acceleration in the three axial directions of the accelerometer from the first acceleration data.

15. The device according to claim 14, wherein the instructions to determine the gravitational acceleration data include instructions to:
perform space curve fitting processing on the first acceleration data to obtain the directional data wherein the directional data indicates the direction of the gravitational acceleration in the coordinate system space constituted by the three axial directions of the accelerometer.

16. The device according to claim 14, wherein the device further comprises an OBD interface, configured to connect to an OBD interface of the vehicle; and
the instructions to determine the gravitation acceleration data include instructions to:
acquire vehicle velocity data through the OBD interface;
determine, according to the acquired vehicle velocity data, fourth acceleration data measured by the accelerometer when the velocity of the vehicle is zero; and
determine the magnitude of the gravitational acceleration according to the fourth acceleration data.

17. The device according to claim 12, wherein the instructions generate second acceleration data by eliminating interference generated, on the first acceleration data, by a change of an angle of the accelerometer caused by moving of the accelerometer includes instructions to:
process the first acceleration data by using a locally linear embedding algorithm, and converting acceleration data measured after the change of the angle of the accelerometer caused by the moving of the accelerometer relative to the vehicle, into acceleration data measured when the angle of the accelerometer remains unchanged.

18. The device according to claim 12, wherein the device further comprises a Global Positioning System (GPS) module, configured to measure GPS location information of the vehicle in the running process of the vehicle, wherein the GPS location information comprises longitude and latitude; and wherein the program further has instructions to, after determining the third acceleration data:
acquire the GPS location information, measured by the GPS module, of the vehicle;
determine GPS acceleration data of the vehicle according to the GPS location information; and
correct the third acceleration data by using the GPS acceleration data of the vehicle determined according to the GPS location information.

19. The device according to claim 12, wherein the device further comprises an On-Board Diagnostics (OBD) interface, configured to connect to an OBD interface of the vehicle; and wherein the program further includes instructions to, after determining the third acceleration data:
acquire vehicle velocity data through the OBD interface;
determine velocity-based acceleration data of the vehicle according to the vehicle velocity data; and
correct the third acceleration data by using the velocity-based acceleration data.

20. The device according to claim 18, wherein the instructions to correct the third acceleration data include instructions to:
correct the third acceleration data of the vehicle in the running process by using a Kalman filtering method.

* * * * *